United States Patent [19]

Knabeschuh et al.

[11] 3,817,952

[45] June 18, 1974

[54] BRANCHED EPDM COPOLYMERS AND A PROCESS FOR THEIR MANUFACTURE

[75] Inventors: Louis Henry Knabeschuh, Beaumont, Tex.; Fred D. Shaw, Jr., Prairie Village, Kans.; Robert David Souffle, Wilmington, Del.

[73] Assignee: E. I. du Pont de Nemours and Company, Wilmington, Del.

[22] Filed: Nov. 12, 1971

[21] Appl. No.: 198,409

Related U.S. Application Data

[63] Continuation-in-part of Ser. No. 25,285, April 2, 1970, abandoned.

[52] U.S. Cl. .................. 260/80.78, 260/79.5 NV
[51] Int. Cl. .............................................. C08d 5/02
[58] Field of Search ......... 260/775, 94.9 GA, 80.78, 260/88.2 S, 887, 889, 777

[56] References Cited
UNITED STATES PATENTS

| | | | |
|---|---|---|---|
| 2,933,480 | 4/1960 | Gresham | 260/80.78 |
| 3,223,674 | 12/1965 | Shloss | 260/41 |
| 3,344,125 | 9/1967 | Gerritsen | 260/79.5 |
| 3,522,222 | 7/1970 | Taylor | 260/80.78 |
| 3,522,225 | 7/1970 | Peri | 260/88.2 |
| 3,681,316 | 8/1972 | Schappell | 260/94.9 GA |

OTHER PUBLICATIONS

Hofmann, W., Vulcanization and Vulcanizing Agents Palmerton Publ. (N.Y.), pages 18, 19, (1965).

*Primary Examiner*—Joseph L. Schafer
*Assistant Examiner*—C. A. Henderson, Jr.

[57] ABSTRACT

A process for producing a vulcanizable branched elastomeric polymer by mixing an EPDM copolymer with sulfur, a sulfur-releasing compound, or a peroxide, and subsequently heating the resultant mixture. The copolymers of the process have less than about 30% gel, a Wallace plasticity of about 30 to 100, and an inherent viscosity of at least about 2.0 at less than 30% gel. Ozone-resistant blends of the copolymers of this invention with other elastomers are also provided.

7 Claims, No Drawings

BRANCHED EPDM COPOLYMERS AND A PROCESS FOR THEIR MANUFACTURE

CROSS-REFERENCE TO RELATED APPLICATIONS

This application is a continuation-in-part of copending application Ser. No. 25,285, filed Apr. 2, 1970 now abandoned, entitled "Branched EPDM Copolymers and A Process for Their Manufacture."

BACKGROUND OF THE INVENTION

This invention relates to vulcanizable chain-saturated elastomeric α-olefin copolymers. More particularly, this invention relates to improving the ozone resistance of blends of conjugated diene elastomers with vulcanizable, chain-saturated, elastomeric α-olefin copolymers by the introduction of a controlled amount of chain branching in the α-olefin copolymer.

Among the polymers of the aliphatic olefins that are made by use of coordination complex compounds of the transition metals as polymerization initiators, the amorphous copolymers of ethylene with higher α-monoolefins constitute an important class because of their desirable elastomeric character and their generally good resistance to ozone and other chemicals. The chemical inertness of these polymers is attributed to the fact that the linear chain or "backbone" is a completely saturated structure without the reactive double bonds of the common elastomeric materials such as natural rubber or the synthetic elastomers made from conjugated diolefins. This chemical inertness made the early polyolefin elastomers, namely amorphous ethylene-propylene copolymers, impossible to vulcanize with the sulfur systems preferred in the rubber industry. This problem was solved by incorporating as a third monomer nonconjugated diolefins containing both a readily polymerizable and a relatively non-polymerizable double bond, thus forming an elastomeric polymer consisting of a linear saturated backbone having pendant unsaturated hydrocarbon groups capable of participating in cross-linking reactions with sulfur-curing systems. The use of nonconjugated aliphatic diolefins such as 1,4-hexadiene and 6-methyl-1,5-heptadiene as the third monomer in hydrocarbon elastomers of this sort is taught, for instance, in U.S. Pat. No. 2,933,480, and the use of bridged ring diolefins having double bonds of unequal reactivity is similarly taught in U.S. Pat. No. 3,211,709. These tripolymers are generally referred to as EPDM copolymers.

Blends of natural rubber and practically linear EPDM copolymers are known in the art. However, the ozone resistance of these blends has not proved entirely satisfactory for use of these blends in tire sidewall formulations. Tire sidewalls are subject to deterioration and failures when formulated using blends of natural rubber and the substantially straight-chain EPDM copolymers.

DESCRIPTION OF THE INVENTION

According to this invention there is provided a process for preparing a vulcanizable branched elastomeric polymer having less than about 30% gel, a Wallace plasticity of about 30 to 100, and an inherent viscosity of at least about 2.0 at less than 30% gel. The branched polymer is produced by mixing an EPDM copolymer having about 0.1–2 gram moles of carbon-carbon double bonds per kilogram of elastomer and a Wallace plasticity of about 20–60 with a promoter, said promoter being:

1. about 0.00125 to 0.00780 gram-atoms of sulfur per 100 grams of copolymer,
2. a sulfur-releasing compound yielding about 0.00125 to 0.00780 gram-atoms of sulfur per 100 grams of copolymer, or
3. about 0.0005 to 0.003 gram-equivalents of an organic peroxide per 100 grams of copolymer, and heating the resultant mixture.

This invention also provides for the branched elastomeric polymer of the aforementioned process.

There is also provided an ozone-resistant vulcanizable composition consisting essentially of 10–50 parts by weight of the branched-elastomeric polymer of this invention and 90–50 parts by weight of at least one conjugated diene elastomer.

The novel modified copolymers of this invention are produced by introducing a controlled amount of chain branching into an ethylene/propylene/nonconjugated diene copolymer (EPDM). The substantially straight-chain copolymer used as starting material for the process should have a Wallace plasticity of about 20–60. The preferred range of Wallace plasticity is about 25–45. The EPDM copolymer should have about 0.1–2 gram-moles of carbon-carbon double bonds per kilogram of unmodified copolymer. Ethylene/propylene/1,4-hexadiene copolymers are preferred as the starting material for the process of this invention.

The branched copolymers of the present invention consist essentially of a linear chain or backbone with branching along the chain. These branched copolymers differ from previously known EPDM copolymers having a practically linear structure. Chain branching is demonstrated by the fact that the copolymers of this invention have physical properties substantially different than those of practically linear copolymers, such as known EPDM copolymers. The properties of the copolymer used to detect branching are the solution (inherent) viscosity and bulk viscosity as indicated by the Wallace plasticity. For example, the inherent viscosity and Wallace plasticity of a practically linear copolymer and a branched copolymer are measured as described in the following examples. The results are compared, and the branched copolymer shows a greater rate of change in Wallace Plasticity than the rate of change in inherent viscosity. Thus, for a given inherent viscosity, the Wallace Plasticity is greater for the branched than for the unbranched copolymer.

The branched copolymer of this invention should have less than 30% gel as determined by the solubility of the copolymer in $C_2Cl_4$ at 30°C. The Wallace plasticity of the branched copolymer should be about 30–100 with about 40–60 being preferred. The inherent viscosity of the branched copolymer is dependent upon the amount of gel in the product. The inherent viscosity should be at least 2.0 at less than 30% gel. As gel decreases, the inherent viscosity increases.

Chain branching is introduced into an EPDM copolymer by mixing the copolymer with a promoter followed by heating the resultant mixture. Promoters useful in this invention are sulfur, sulfur-releasing compounds, and organic peroxides. Mixtures of promoters can also be used for branching EPDM copolymers. Accelerators, such as guanidines and thiazoles, can also be used with the promoters.

When sulfur is used to modify the EPDM copolymer, the amount should be about 0.00125 to 0.00780 gram-atoms of sulfur per 100 grams of copolymer. Amounts of sulfur below this range will not yield the required degree of chain branching, while larger amounts yield a vulcanized copolymer unsuitable for blending with a polyunsaturated rubber. It is not feasible to heat the copolymer with larger amounts of sulfur for a short period of time to obtain chain branching, since it is not possible to terminate the reaction once heating is initiated. The preferred amount of sulfur is about 0.00250 to 0.00625 gram-atoms of sulfur per 100 grams of copolymer. The copolymer and sulfur are heated at a temperature of about 150°C. to 260°C. to induce branching. The preferred temperature range is about 220°C. to 235°C.

A sulfur-releasing compound can also be used to promote chain branching in an EPDM copolymer. Sulfur-releasing compounds useful in the present invention are organic polysulfides generally, preferred compounds being 4,4'-dithio-dimorpholine and dipentamethylene thiuram hexasulfide. The amount of the sulfur-releasing compound used depends upon the amount of sulfur in the compound which is released when the compound is heated. The amount of the sulfur-releasing compound required is conveniently expressed as an amount which, when heated, yields about 0.00125 to 0.00780 gram-atoms of sulfur per 100 grams of copolymer. It is preferred to use an amount of sulfur-releasing compound yielding about 0.00250 to 0.00625 gram-atoms of sulfur per 100 grams of copolymer. The copolymer and sulfur-releasing compound are heated at a temperature of about 150°C to 260°C. to effect branching. The preferred temperature is about 220°C. to 235°C. The reaction is completed in a relatively short period. For example, at 250°C. the branching process will be completed in about 1 to 5 minutes when using sulfur or a sulfur-releasing compound.

Organic peroxides and hydroperoxides, generally, can be used as the promoter to introduce chain branching in the EPDM copolymer. The organic peroxides are sources of free radicals. Although they are consumed during the reaction producing chain branching, they are not part of the final product. The temperature at which an organic peroxide can be made to decompose into useful free radicals largely determines the application area. The efficiency of a free-radical generator depends primarily upon its thermal decomposition rate at a given temperature and upon the ability of the free-radicals formed to carry out the desired reaction. A convenient means of expressing the rate of decomposition of an organic peroxide at a specified temperature is in terms of its half-life, which is the time required to decompose one-half of the peroxide present. The half-life of an organic peroxide is generally a function of the structure of the peroxide, the temperature, peroxide concentration, and solvent used for the peroxide. As a first approach in finding the best peroxide modifier, one should select the peroxide with half-life characteristics best suited to the conditions of the reaction.

Half-life data can be obtained from decomposition studies of organic peroxides in dilute solutions. Experimental methods and analytical techniques are known to those skilled in the art. A particularly useful reference is D. L. Mageli, S. D. Bukata, and D. J. Bolton, "Evaluation of Organic Peroxides From Half-Life Data," Ludicol Division, Wallace & Tiernan, Inc. The thermal decomposition of most peroxides in inert solvents has been shown to follow first order kinetics. Therefore, linear relationships are obtained when the logarithm of the half-life of a particular peroxide is plotted against the reciprocal of the absolute temperature. From this data, the desired peroxide can be selected for particular reaction conditions.

Typical organic peroxides useful in the present invention are t-butyl peroxypivalate, 2,4-dichlorobenzoyl peroxide, decanoyl peroxide, propionyl peroxide, benzoyl peroxide, hydroxyheptyl peroxide, cyclohexanone peroxide, 2,5-dimethylhexyl-2,5-di(peroxybenzoate), t-butyl perbenzoate, dicumyl peroxide, 2,5-dimethyl-2,5-di(t-butylperoxy)hexyne-3,2,5-dimethyl-2,5-di(t-butylperoxy)hexane, 2,5-dimethyl-2,5-di(benzoylperoxy)hexane, di-t-butyl peroxide, p-menthane hydroperoxide, cumene hydroperoxide, 2,5-dimethyl-2,5-di(hydroperoxy)hexane, t-butyl hydroperoxide, and lauroyl peroxide. Preferred organic peroxides are t-butyl perbenzoate, 2,5-di-methyl-2,5-di(t-butylperoxy)hexyne-3, dicumyl peroxide, and 2,5-dimethyl-2,5-di(t-butylperoxy)hexane.

The preferred amount of peroxide to be used as a promoter in the present invention is about 0.0005 – 0.003 gram-equivalents of peroxide per 100 grams of copolymer. The quantity of peroxide chosen within each limit depends on the activity of the peroxide and on the particular polymer chosen. The limits above are based on the use of pure peroxide. If a peroxide composition is employed which has less than 100% active ingredient, e.g., one containing inert filler to aid in weighing, the quantity of this composition will be chosen so that the amount of the peroxide itself falls within the range specified. The half-life of the peroxide used is a function of the temperature at which the heating is conducted. The heating should be conducted for a time and at a temperature such that at least about one half-life of the peroxide lapses. Heating should preferably be conducted for a time and at a temperature such that at least three half-life periods of the peroxide lapse. There is generally no practical reason for operating for more than 10 half-life periods.

The EPDM polymer can be compounded before heating on conventional rubber processing equipment. The promoter can be added as a solid, slurry, solution, or paste.

Processing oils can be present; however, it is desirable that oils be absent during the process of this invention. A greater amount of promoter is required if oils are present due to consumption of the promoter in side reactions with the oil.

The branched-elastomeric copolymers of the present invention can be produced by either a continuous process or a batch process.

The branched chain elastomeric copolymers of this invention have been found to be especially useful in blends with polyunsaturated elastomers such as natural rubber and the synthetic diene elastomers. It is known in the art that the EPDM elastomers confer a measure of ozone resistance on such blends, but it has surprisingly been found that the branched-chain copolymers of this invention are much more effective than the prior art terpolymers. The blends of this invention can be processed using conventional rubber processing equipment in the same manner as known EPDM/polyunsaturated elastomer blends. The copolymers of this invention are only useful in blends if chain-branched prior to blending with other elastomers. It is not possible, for instance, to obtain the superior ozone-resistant blends of this invention by mixing an unbranched copolymer (e.g., known EPDM) with a promoter, and natural rubber, and subsequently heating the mixture. About 10–50 parts by weight of the branched copolymer of this invention can be blended with 90–50 parts by weight of a polyunsaturated elastomer. The preferred ratio is 10–30 parts by weight of branched copolymer to 90–70 parts by weight of at least one conjugated diene elastomer, such as natural rubber, styrene/butadiene, 1,4-polyisoprene, and neoprene.

Conventional compounding ingredients such as carbon black, mineral fillers, such as clay, coloring agents, extending oils and the like can be incorporated into the polymers after the chain branching polymerization process. Preferably, no ingredient should be added which will reduce ozone resistance.

The novel copolymers of this invention are cured after the chain branching process. Various curing systems for the branched copolymers or blends can be employed, as will be apparent to those skilled in the art. The most important of these curing systems are the sulfur curing system and peroxide curing system.

This invention is further illustrated by the following specific examples. All parts, percentages, and proportions are by weight unless otherwise indicated. As used herein, the term "phr" means parts of the specified ingredient per 100 parts of copolymer.

EXAMPLE 1

A. Test Methods

Mooney Viscosity

Mooney viscosity is measured at 121°C. in accordance with ASTM Method D–1646–67 using the large rotor. After the sample has been warmed in the machine for one minute, the shearing disc viscometer motor is started to begin the test. 4 minutes later the reported viscosity reading is taken.

Wallace Plasticity

Wallace Plasticity is a measure of the amount of flow or deformation of unvulcanized elastomeric materials under load. The sample to be tested is sheeted and cut into pellets having a thickness in the range of 3.18–6.35 mm (0.125–0.300 inch). The test is performed with a Wallace Plastimeter manufactured by H. W. Wallace and Co., Ltd. London. During a 10-second period the pellet is simultaneously compressed to exactly 1.0 mm in thickness and heated to 100°C., the resulting test piece is then subjected to a 10-kg. load for exactly 15 seconds at 100°C. The final thickness of the test piece, expressed in units of 0.01 mm, is the plasticity value reported. The standard 1-cm diameter platen is suitable for pellets of average hardness. Proper platen temperature regulation is most important because elastomer plasticity is usually temperature dependent. Plasticity readings should normally fall between 20–90 on the scale for most reliable readings.

Stress-Strain

Modulus at 100% and 300% extension, tensile strength at break, % elongation at break, and permanent set at break are measured in accordance with ASTM Method D–412–66 (for the permanent set, section 5.5 is modified by use of a 5-minute hold time).

Ozone Resistance Test for Examples 1 and 2

Standard dumbbells (die C, ASTM Test Method D–412–66) are cut from 2.54 × 12.70 × 0.19-cm [1 × 5 × 0.075 inch] vulcanizate slabs and stored at 25°C. for at least 24 hours before testing.

The dumbbells are tested dynamically in a "Dynamat" attachment in a Mast test chamber (Model 700–1 manufactured by Mast Development Co., Davenport, Iowa) at 40°C. while exposed to 0.5 parts per million ozone. During the test, the dumbbells are alternately elongated 25% and relaxed at about 30 cycles per minute. At the end of the tests, or at predetermined intervals, the speciments are compared to determine the amount and degree of cracking. The examinations are made visually under 10X magnification and/or with the unaided eye at 12 in. and 36 in.

B. Preparation of EPDM Copolymer

An EPDM copolymer is made by copolymerizing ethylene with propylene and 1,4-hexadiene in solution in tetrachloroethylene in the presence of a coordination catalyst prepared in situ by mixing vanadium tetrachloride with diisobutyl aluminum monochloride in accordance with known procedures (see U.S. Pat. No. 2,933,480); hydrogen modification is employed during the preparation in accordance with U.S. Pat. No. 3,051,690. The EPDM copolymer has a Mooney viscosity of about 45 (ML–1+4/121°C.) and contains about 0.33 gram-mol of ethylenic unsaturation per kilogram of polymer. EPDM has the following monomer unit composition by weight: 65% ethylene; 33% propylene; and 4% (total) 1,4-hexadiene. Its inherent viscosity is about 2.32 (measured at 30°C. with a solution of 0.1 gram of copolymer is 100 ml. of tetrachloroethylene); its Wallace plasticity is about 31.

C. Preparation of Chain Branched EPDM Copolymer Using Sulfur Promoter

Sulfur (0.01063 gram-atoms) is mixed into 250 grams of the EPDM produced in part B above on a warm 4 × 8 inch rubber roll mill (about 80°–90°C.). The resulting EPDM-sulfur mixture is then charged into a 250-ml. Farrell Midget Banbury (preheated to about 150°C. with steam) and masticated therein for 2¾ minutes at about 160 rpm; the recorded temperature reaches about 177°C. after 1¾ minutes and remains in the range of 177°C.–185°C. The resulting EPDM copolymer is dumped (estimated stock temperature 205°–245°C.) and allowed to cool slowly. Its inherent viscosity at 4% gel and Wallace plasticity, 2.91 and 74 respectively, and higher than that of unmodified EPDM.

D. Preparation of Ozone-Resistant Blends

A 250-ml. Farrell Midget Banbury, operated at 142 rpm, is preheated to 32°C. and loaded in the following way: 164 grams of natural rubber (smoked sheet) are masticated for 1 minute; 41 grams of the sulfur-modified EPDM from Part C above are added and mastication continued for 2 more minutes; then 7 grams of zinc oxide, 6 grams of naphthenic petroleum oil ("Circo" Light R.P.O. having SUS Viscosities of 156 and 41 at 37.8°C. and 98.9°C., respectively), 52 grams of fast extrusion furnace carbon black (ASTM Designation N–550), and 4 grams of stearic acid are added practically simultaneously; mastication is continued for 3 minutes longer. The indicated machine temperature is then about 105°–115°C. The resulting masterbatch is dumped, cooled, and put on 10.16 × 20.32-cm [4 × 8-inch] rubber roll mill preheated to 55°–60°C. There it is compounded as follows:

|  | Grams | Control Grams |
|---|---|---|
| Masterbatch from Part D | 200 | — |
| Copolymer of Part B - with natural rubber as in D - Control | — | 200 |
| 2,2'-Dithiobis(benzothiazole) | 0.9 | 0.9 |
| Diphenyl guanidine | 0.7 | 0.7 |
| Sulfur | 2.6 | 2.6 |

Following the same procedure, a control is made using the unmodified copolymer of Part B above. The resulting compositions are cured in a 15.24 × 15.24 × 0.19 cm. slab mold for 15 minutes at 160°C.

The vulcanized blends made above typically have the following stress-strain properties at 25°C.

|  |  | Control |
|---|---|---|
| Modulus at 300%, kg/cm$^2$ | 87.5 | 63.0 |
| Tensile strength, kg/cm$^2$ | 238.0 | 224.0 |
| Elongation at Break, % | 585 | 600 |
| Permanent Set at Break, % | 25 | 25 |

The blend using the copolymer modified according to the process of this invention remains practically uncracked after being dynamically stretch tested in ozone for 24 hours. In contrast, a control made from the unmodified EPDM of Part B above and natural rubber develops numerous small cracks within 2–3 hours and is covered with cracks after 24 hours.

EXAMPLE 2

A. Test Method

Determination of Percent Gel

A 99–101 mg. polymer sample is cut into small pieces and placed in a 6 ounce square flint bottle. After 100.0 ml. of dry tetrachloroethylene have been added, the bottle is capped and shaken for about 16 hours at 30°C. to dissolve the polymer. If a visible residue of insoluble matter still remains, the flask is heated on a steam bath for 30 minutes.

Then an empty 25 × 100 millimeter single-thickness cellulose extraction thimble is placed in the solution in the bottle, the bottle is capped, and the polymer solution at 30°C. is allowed to flow through the thimble walls and collect inside it. A 50 ml, portion of the solution inside the thimble is removed and placed in a weighed 70 mm. aluminum dish. After the tetrachloroethylene has been evaporated by heating the dish on a steam bath, the dish is placed in a vacuum (50–100 mm. Hg.) oven at 80°C.±1° for 1 hour. Twice the weight of the dry residual polymer on the dish gives the weight of soluble polymer in the original polymer in the original sample.

% gel = (total polymer sample weight - soluble polymer weight)/total polymer sample weight B. Preparation of Chain Branched EPDM Copolymer Using Organic Peroxide Promoter Samples A to E are prepared by mixing various amounts of 2,5-dimethyl-2,5-di(tert-butyl peroxy)hexane with the EPDM polymer of Example 1B on a rubber roll mill at 80°C. for 5 to 10 minutes. The promoter has a gram-molecular weight of 290 and 2 peroxy groups. The gram-equivalent weight of the promoter is 145.

| PARTS OF PEROXIDE FOR 100 PARTS OF EPDM | | | | | |
|---|---|---|---|---|---|
| A | B | C | D | E | Control |
| 0.14 | 0.16 | 0.18 | 0.20 | 0.23 | 0.00 |

| GRAM-EQUIVALENTS OF PEROXIDE FOR 100 PARTS OF EPDM | | | | | |
|---|---|---|---|---|---|
| A | B | C | D | E | Control |
| .001 | .0011 | .0012 | .0014 | .0016 | 0.000 |

The resulting compositions are sheeted out, cooled to 25°C., and placed in an aluminum mold having a 0.25-inch deep cavity. The mold is placed between the platens of a press which is at 210°C. The temperature of each sample is thereafter measured by a probe through the center of the platens into the mold. The platens are heated and the sample temperatures brought to 190°C. in about 3.3 to 3.8 minutes. Further heating over a 2-minute period raises the sample temperatures still higher (to about 200°–206°C.). The samples are then removed and cooled to 25°C. The Wallace plasticity is determined within 24 hours.

This treatment consumes practically all the peroxide (its half-life is only 4.8 minutes at 160°C. and 0.24 minute at 190°C.). About 10 or more half-life periods lapse. The modified EPDM will not cure unless curing agent is added.

The following table provides typical data:

| Sample | Time to 190°C. | Final T (°C.) | Wallace Plast. | Inherent Viscosity | % Gel |
|---|---|---|---|---|---|
| A | 3' 46" | 205° | 65 | 2.92 | 0 |
| B | 3' 17" | 201° | 68 | 3.01 | 0 |
| C | 3' 40" | 206° | 80 | 3.40 | 0 |
| D | 3' 27" | not det'd. | 87 | 3.38 | 2 |
| E | 3' 50" | 205.5° | >100 | 2.23 | 17 |
| Control | — | — | 33 | 2.32 | — |

C. Preparation of Ozone Resistant Blends

The procedure of Example 1 for making ozone resistant blends (80 parts natural rubber: 20 parts modified EPDM) is changed by substituting 40 grams of peroxide-modified EPDM made by the procedure of Part B of this Example for 41 grams of sulfur-modified EPDM and decreasing the amount of natural rubber (smoked sheet) to 160 grams.

After test specimens made from the resulting vulcanizates have been dynamically tested for 24 hours at 40°C. in air containing 0.5 parts per million ozone, their ozone resistance ratings are typically as follows:

| OZONE RESISTANCE | | | | | |
|---|---|---|---|---|---|
| A | B | C | D | E | Control |
| excellent | very good | excellent | excellent | excellent | poor |

EXAMPLE 3

A. Preparation of an Ethylene/Propylene/1,4-Hexadiene Copolymer

An EPDM Copolymer is made by copolymerizing ethylene with propylene and 1,4-hexadiene in solution in tetrachloroethylene in the presence of a coordination catalyst formed by premixing diisobutyl aluminum monochloride with vanadium oxytrichloride in accordance with known procedures (see U.S. Pat. No. 2,933,480). Hydrogen modification is employed during the preparation in accordance with U.S. Pat. No. 3,051,690. The EPDM Copolymer has a Mooney viscosity (ML-1+4/121°C.), determined by ASTM Method D-1646-67, of about 40 and contains about 0.6 gram-mol of ethylenic unsaturation per kilogram of polymer. The EPDM Copolymer has the following monomer unit composition by weight: 53% ethylene; 40% propylene; and 7% (total) 1,4-hexadiene. The Wallace Plasticity is about 26.

B. Preparation of Chain-Branched EPDM Copolymer of Part A Using 4,4'-Dithiomorpholine Promoter After 2,400 grams of the EPDM Copolymer of Part A have been banded on a rubber roll mill at about 15-21°C., 12 grams of 4,4'-dithiodimorpholine are added to it and well dispersed. The resulting mixture is charged into a 4,320-cc. Banbury internal mixer Model 00C. The Banbury is preheated to about 121°C. with steam, operated at about 64 rpm and at a ram pressure of 50 psi. After the Banbury recorded temperature has reached about 190.5°C., operation is continued at about 176.7°C. for 30 seconds. Immediately thereafter the resulting chain-branched EPDM copolymer is dumped and cooled. The wallace Plasticity of the branched EPDM is about 60, and the inherent viscosity greater than 2.2 at less than 30% gel.

C. Preparation of Ozone Resistant Blends

Two blends C-1 and C-2 are prepared in a Banbury mixer according to the formulations given below. C-2 is a control, outside the scope of this invention, provided merely for purposes of comparison.

| Component | Parts by Weight | |
|---|---|---|
| | C-1 | C-2+ |
| Smoked sheet (natural rubber) | 80 | 80 |
| Chain branched EPDM Copolymer of Part A | 20 | 0 |
| EPDM Copolymer of Part B | 0 | 20 |
| ZnO | 5 | 5 |
| Medium thermal black* | 15 | 15 |
| Fast extrusion furnace black** | 30 | 30 |
| Naphthenic petroleum oil*** ("Circo Light Oil 42×H") | 10 | 10 |
| Stearic acid | 1.5 | 1.5 |
| 2,2'-Dithiobis(benzothiazole) | 0.7 | 0.7 |
| Di-o-tolylguanidine | 0.3 | 0.3 |
| Sulfur | 2 | 2 |

+ control
* ASTM Designation N-990 or 991
** ASTM Designation N-550
*** SUS viscosities 2825 and 87.2 at 37.8°C. and 98.9°C. respectively; viscosity-gravity constant, 0.889

The following procedure is used. Smoked sheet and EPDM are blended in a Banbury internal mixer Model B having a capacity of about 2,500 cc. The mixer is cooled by circulating water at about 15°-21°C. After about a minute, all the remaining components except the curing agents are charged. When the recorded temperature reaches about 121°C., the mixture is dumped, cooled, and compounded with the curing agents on a rubber roll mill at about 15°-21°C.

After a 15-minute cure at 162.2°C., the resulting vulcanizates display the following properties* at 25°C.:

* Stress-strain ASTM Method D-412-66
Shore A hardness ASTM Method D-2240-64T

| | Stock C-1 | Stock C-2+ |
|---|---|---|
| Modulus at 100% Extension, kg/cm$^2$ | 20.0 | 16.9 |
| Modulus at 200% Extension, kg/cm$^2$ | 49.2 | 39.4 |
| Modulus at 300% Extension, kg/cm$^2$ | 91.4 | 75.2 |
| Tensile Strength at Break, kg/cm$^2$ | 190.5 | 178.6 |
| Elongation at Break, % | 500 | 540 |
| Shore A Hardness | 55 | 55 |

+ Control

D. Ozone Resistance of Blends

Specimens are prepared by adhering canvas backing to one side of cured slabs of the blends C-1 and C-2 made by the procedures of Part C above. The measurements of the slabs are: 15.24 cm × 1.35 cm × 0.19 cm. The specimens are draped around a 1.90 cm diameter mandrel positioned in a chamber maintained at about 40°C. and containing 0.5 ppm ozone. A 0.5103 Kg weight is attached to one end of each specimen. A clamp, fixed to a reciprocating arm, is fastened to the other end. The arm travels a distance of 7.5 cm. During the test a 4-inch length of the canvas backed side of each specimen is drawn across the mandrel 30 times each minute.

Test specimens made from C-1 incorporating the copolymer of this invention show only a few cracks, microscopic in size, after 10 hours treatment. In contrast, the control specimens, C-2, display many medium sized cracks visible to the naked eye at 12 inches. After 30 hours, test specimens C-1 show only a few medium sized cracks visible to the naked eye at 12 inches. The control specimens, C-2, show many large cracks visible to the naked eye at 3 feet.

We claim:

1. A process for the preparation of a vulcanizable branched elastomeric polymer having less than about 30% gel, a Wallace plasticity of about 30-100, and an inherent viscosity of at least 2.0 at 30°C. as measured in a solution of 0.1 gram of copolymer in 100 ml. of tetrachloroethylene, said process consisting essentially of:

A. mixing
 1. an EPDM copolymer having 0.1-2 gram moles of carbon-carbon double bonds per kilogram of copolymer and a Wallace plasticity of about 20-60, and
 2. at least one peroxide which generates free radicals, said peroxide being an organic peroxide or hydroperoxide, in the amount of about 0.0005 to 0.003 gram equivalents peroxide per 100 grams copolymer, and B. heating the mixture at a temperature of about 150°C. to 260°C.

2. A process of claim 1 wherein the promoter is a peroxide from the group: t-butyl peroxypivalate, 2,4-dichlorobenzoyl peroxide, decanoyl peroxide, propionyl peroxide, benzoyl peroxide, hydroxyheptyl peroxide, cyclohexanone peroxide, 2,5-dimethylhexyl-2,5-di(peroxybenzoate), t-butyl perbenzoate, dicumyl peroxide, 2,5-dimethyl-2,5-di(t-butylperoxy)hexyne-3, 2,5-dimethyl-2,5(t-butylperoxy)hexane, 2,5-dimethyl-2,5-di(benzoylperoxy)hexane, di-t-butyl peroxide, p-methane hydroperoxide, cumene hydroperoxide, 2,5- dimethyl-2,5-di(hydroperoxy)hexane, t-butyl hydroperoxide, and lauroyl peroxide.

3. The process of claim 1 wherein the promoter is about 0.0005 to 0.003 gram-equivalents of an organic peroxide per 100 grams of copolymer and the heating is conducted at a time and temperature such that at least about one half-life of the peroxide lapses.

4. The process of claim 1 wherein the promoter is about 0.0005 to 0.003 gram-equivalents of an organic peroxide per 100 grams of copolymer and the heating is conducted at a time and temperature such that at least three half-life periods of the peroxide lapse.

5. The process of claim 4 wherein the peroxide is t-butyl perbenzoate, 2,5-dimethyl-2,5-di(t-butylperoxy)hexane, 2,5-dimethyl-2,5-di(t-butylperoxy)hexyne-3.

6. The process of claim 1 wherein the EPDM copolymer is an ethylene/propylene/1,4-hexadiene copolymer having a Wallace plasticity of about 24–25.

7. The product prepared by the process of claim 1.

* * * * *

PO-1050
(5/69)

UNITED STATES PATENT OFFICE
CERTIFICATE OF CORRECTION

Patent No. 3,817,952   Dated June 18, 1974

Inventor(s) Louis Henry Knabeschuh, Fred D. Shaw, Jr. and Robert David Souffie

It is certified that error appears in the above-identified patent and that said Letters Patent are hereby corrected as shown below:

In the third line of Claim 6, substitute the expression "25-45" for "24-25".

Signed and sealed this 4th day of March 1975.

(SEAL)
Attest:

RUTH C. MASON
Attesting Officer

C. MARSHALL DANN
Commissioner of Patents
and Trademarks